UNITED STATES PATENT OFFICE.

JOHN S. BRESSLER, OF MILWAUKEE, WISCONSIN, ASSIGNOR TO ANTHONY IHMS, OF SAME PLACE.

IMPROVED PROCESS FOR MAKING BEER.

Specification forming part of Letters Patent No. 53,078, dated March 6, 1866.

*To all whom it may concern:*

Be it known that I, JOHN S. BRESSLER, of the city of Milwaukee, in the county of Milwaukee, in the State of Wisconsin, have invented a new and Improved Process of Brewing Beer; and I do hereby declare that the following is a full and exact description thereof.

The nature of my invention consists in using Indian corn or maize and malt in proportions to be herein set forth with water in quantities and under degrees of heat to be described, so as to extract the sugar and gum from the maize at once without first forming starch of the maize, and by one simple manipulation, as will hereinafter more fully appear.

That others skilled in the art may make use of my invention, I will proceed to describe it.

The two necessary ingredients in beer are sugar and gum. These are contained in maize. The principal substance of corn or maize is ammeline. Every particle of ammeline is inclosed in a membrane which contains a gummy substance called "dextrine," and when heated in water the membrane will burst, and a paste will be formed if left unacted upon by other agents. Malt contains diastase. This will burst the membrane in which it is contained when heated to about 124° Fahrenheit. When one molecule of diastase comes in contact with two thousand of ammeline and seven thousand of water then the diastase will so affect the dextrine of the maize as to produce the sugar and gum at once, so that no starch is first formed out of the maize, but proportions of ingredients and degrees of heat must be properly observed.

For the purpose of brewing sixty barrels of beer I take sixty bushels of coarsely-ground malt and sixty bushels of maize finely ground. The sixty bushels of maize contains fifteen hundred pounds of ammeline. This quantity of ammeline requires five thousand two hundred and fifty pounds of water for the formation of sugar and eighteen hundred pounds more water for wetting those parts of ammeline contained in the membrane. The sixty bushels of malt require seven thousand seven hundred and forty pounds of water. Hence, altogether, fourteen thousand seven hundred and ninety pounds of water are required to effect the process of sugar and gum formation of the maize and the malt. It is a fact that the sugar formation from the maize and the malt is complete under 140° to 163° Fahrenheit. Hence the mash must have this temperature in order to render the work successful.

Now, for the purpose of brewing sixty barrels of beer I pour nine hundred to nine hundred and twenty-four gallons of water heated to 80° to 100° Fahrenheit in the mash-tub, set the mash-machine in motion, pour sixty bushels finely-ground maize slowly in the water, keeping the mash-machine in rapid motion during that time. I immediately add sixty bushels coarsely-ground malt to the maize in the tub. When this is done I pour nine hundred to nine hundred and thirty gallons more of hot water of sufficient heat to raise the temperature of the mixture to 140° to 163° Fahrenheit, and see to it that the mass is properly mixed, and then after it has been in motion for from thirty to forty-five minutes I let the mixture stand. After the lapse of about two hours the chemical process of sugar and gum formation will be realized. Then I draw off from nine hundred to one thousand gallons of wort. After this I pour about nine hundred gallons of hot water of 180° to 195° Fahrenheit over the mixture in the mash-tub, and work the same through for about fifteen minutes for the purpose of extracting all the sugar of the mash. After the lapse of one hour more I draw off the wort yet remaining in the mash-tub and put all the wort in the boiler, when boiling should commence. After this the treatment should be the same as in cases of beer brewed from barley.

What I claim as my invention, and desire to secure by Letters Patent, is—

The process hereinbefore described of preparing mash for brewing beer by the use of corn or maize and malt in quantities and manner as set forth, with the application of water in quantities and under degrees of heat, as described, and in the manner substantially as set forth, by uniting the malt and the maize by one manipulation and mashing the two together before any chemical change has taken place in either grain.

JOHN S. BRESSLER.

Witnesses:
FRED. RIETBROCK,
WM. G. WHIPPLE.